(12) United States Patent
Elshishiny (10) Patent No.: US 7,358,969 B2
(45) Date of Patent: Apr. 15, 2008

(54) METHOD AND SYSTEM FOR PARTITIONING THE SURFACE OF A THREE DIMENTIONAL DIGITAL OBJECT MODEL IN ORDER TO MAP A TEXTURE

(75) Inventor: Hisham Emad El-Din Elshishiny, Giza (EG)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/236,456

(22) Filed: Sep. 27, 2005

(65) Prior Publication Data

US 2006/0066613 A1   Mar. 30, 2006

(30) Foreign Application Priority Data

Sep. 27, 2004   (EP)   ................... 04300623

(51) Int. Cl.
*G06T 15/00* (2006.01)
(52) U.S. Cl. ................ 345/420; 345/582; 382/100
(58) Field of Classification Search ........ 345/419–423, 345/582–589; 382/100, 108
See application file for complete search history.

(56) References Cited

U.S. PATENT DOCUMENTS

| 6,057,848 | A  | * | 5/2000 | Goel | 345/423 |
| 6,211,883 | B1 | * | 4/2001 | Goel | 345/423 |
| 6,552,725 | B1 | * | 4/2003 | Houtman et al. | 345/423 |
| 6,618,047 | B1 | * | 9/2003 | Lim | 345/421 |
| 6,876,956 | B1 | * | 4/2005 | Cirak et al. | 703/2 |

\* cited by examiner

*Primary Examiner*—Phu K. Nguyen
(74) *Attorney, Agent, or Firm*—Mark S. Walker; Suiter Swantz pc llo (57) ABSTRACT

The present invention is directed to a method and system and computer program for decomposing a triangle mesh representing the surface of a digital object model, reconstructed from 3D scanning data, into a small number of height-field patches (partitions) (in the order of the number of the original scans) with reasonable angular variations with the direction from which the viewer is looking at the digital object and with boundaries as regular as possible, in order to map a texture. The present method uses the original scan information (even when scans are divided into two or more connected meshes), but without selecting a single scan per mesh area.

7 Claims, 6 Drawing Sheets

METHOD AND SYSTEM FOR PARTITIONING THE SURFACE OF A THREE DIMENTIONAL DIGITAL OBJECT MODEL IN ORDER TO MAP A TEXTURE

TECHNICAL FIELD OF THE INVENTION

The present invention relates to the field of computer graphics, to a method and system for efficiently partitioning the surface of a three dimensional (3D) digital object model, reconstructed from scanning data, to map a texture.

BACKGROUND ART

Technical Field

The creation of three dimensional digital objects by scanning real objects has become a common practice in computer graphics applications, such as computer games, electronic commerce, virtual museums. A variety of techniques are used to capture a digital model from a physical object. Laser triangulation systems (for objects smaller than a meter in the largest dimension) are good examples of popular devices for capturing range images (a scan image wherein each pixel in the image represents a three dimensional point). The creation of a digital model from a series of captured scans comprises the following steps. After removal of disconnected points not related to the scanned object, the scans take the form of individual three dimensional meshes. These scans are first aligned into a single global coordinate system. The aligned scans do not form a single surface, but often interpenetrate one another due to errors during the acquisition of data, primarily along the line-of-sight in each scan. To build a single surface, overlapping scans are averaged. Then, after correction of line-of-sight errors, the scans are integrated into a single mesh.

Initial Problem

The construction of a digital object model from three dimensional (3D) scanning data requires the association of geometric data with non-geometric data such as color and surface aspect or finish. A method to do this, is to associate a color with every vertex of the mesh representing the digital model surface. In most objects however, the spatial resolution required to store color variations is much higher than the resolution needed to represent the geometry of object. It is a common practice to represent the color by associating with the geometric data, 2D color images as texture maps. The association of 2D maps with a 3D geometry requires a split or a partition of the surface of the object. The following rules are used for an efficient surface partitioning:

1—Small Number of Patches (Partitions):

The time to compute the textures is roughly proportional to the number of scans multiplied by the number of patches. The reading of the scans can take up to 50% of the time to process each patch. The time to read a scan is constant and is independent of the size of the patch. Therefore, a small number of patches will greatly reduce the time needed to process texture maps.

2—Compact Textures for Packing:

The display with graphic hardware requires the packing of the textures into a single, nearly square, image. This packing is inefficient if shapes have irregular boundaries. In particular, the memory where texture data is stored is wasted by the storage of black pixels.

3—Human Readable Textures:

It is efficient to make a lot of small adjustments (for instance to change the color of some details) on the texture directly. These adjustments are more difficult to do when the texture is chopped into small and unrecognisable features, or when severe distortions are introduced by flattening the object.

4—Textures with Boundary Data for Mipmapping:

Mipmapping is a common technique for averaging texture data in order to make an efficient use of the texture memory when objects are displayed at a relative small scale on a screen. In order to avoid the introduction of artefacts in the texture when this averaging is performed, each block of texture must be surrounded with texture data from the area around it.

Prior Art

Early methods of building objects from scanning data were based on a method called "Stitching or Zippering to Build up a Mesh" (Zippered Polygon Meshes from Range Images, Greg Turk and Marc Levoy, Computer Graphics Proceedings, Annual Conference Series, 1994, ACM SIGGRAPH, pp. 311-318.) In this approach, after alignment of the scans, the mesh is built by considering scans pair wise. The first pair of scans is compared, each scan is cut in the region where they overlap, and the vertices on the cut boundary are connected by adding triangles. A third scan is added, a new cut is made, and so on. This results in a mesh in which each mesh region can be associated with a texture map associated with the original scans. This method generates a lot of problems. Building a mesh where each region is sampled by points from only one scan, results in a poor representation of the surface. Also, there are often more than two scans overlapping in a region. Difficulties also arise when the method is applied to scans divided into two or more separate meshes.

In view of these problems, other methods for building meshes, such as volumetric (A Volumetric Method for Building Complex Models from Range Images, Brian Curless and Marc Levoy, Proc. SIGGRAPH '96) or ball pivoting (The Ball-Pivoting Algorithm for Surface Reconstruction, Fausto Bernardini et al., IEEE Transactions on Visualisation and Computer Graphics, Vol. 3, No. 4, October-December 1999) methods are used to appropriately sample the surface and make use of all of the data gathered from each region of the surface. In these methods, the association with the original scans does not exist any more and the surface must be partitioned to be textured. These methods include the following approaches:

a—Computing the texture triangle by triangle, and packing the triangles into a single image. This can produce a compact texture. However, the computation of the texture is not optimised. Furthermore, the texture is not human readable, or is not suitable for mipmapping.

b—Cutting and distorting the surface to flatten it. This can help to reduce the number of patches, and boundary data can be stored with the flattened surface. However, the texture is not human readable, and flattening on its own does not guarantee that the resulting texture will be compact enough for packing into a square texture image.

c—Starting with an initial mesh triangle on the digital model surface and then adding to this initial mesh triangle, triangles one by one to accumulate a patch. When the orientation of the resulting surface of the patch reaches a specified threshold, we consider that the patch is created, and we start accumulating a new patch and so on. This can result in a large number of patches for an object with many small features. The problem is that the computation of the texture is inefficient with irregular patches that don't pack well. By shattering the texture into many small patches, the human readability can also be very poor.

Residual Problem

Methods according to the prior art, produce a texture that is not human readable and not suitable for mipmapping. Furthermore, the computation of the texture is not optimised. Patches are irregular and don't pack well. It results in a waste of memory for storing texture data.

Therefore, to avoid the problems and deficiencies of prior art methods described previously, it is necessary to partition the surface with:
a minimum number of height field patches (3D mesh patches),
boundaries as regular as possible.

The surface must be partitioned based on the original scan information but without selecting a single scan per area or without using original sample positions from a particular scan as in zippering method.

OBJECTS OF THE INVENTION

It is an object of the present invention to provide a system and method for partitioning a mesh, representing the surface of a digital object model built from three dimensional (3D) scanning data in order to map a texture.

It is another object of this invention to provide a system and method for partitioning the mesh, representing the surface of a digital model, into a small number of partitions, with reasonable angular variations with the view direction, and with boundaries as regular as possible in order to efficiently map the texture.

SUMMARY OF THE INVENTION

The present invention is directed to a method and system and computer program as defined in independent claims for decomposing a triangle mesh representing the surface of a digital object model, reconstructed from 3D scanning data, into a small number of height-field patches (partitions) (in the order of the number of the original scans) with reasonable angular variations with the direction from which the viewer is looking at the digital object and with boundaries as regular as possible, in order to map a texture. The present method uses the original scan information (even when scans are divided into two or more connected meshes), but without selecting a single scan per mesh area.

The method for partitioning a triangle mesh representing the surface of a digital object model into a plurality of patches in order to map a texture, comprises the main steps of:
computing the intersection between the triangle mesh of the digital object model and the triangle meshes of each scan of the digital object model; each scan having at least one triangle mesh;
identifying:
　a patch associated with the triangle meshes of each scan, only one patch being associated with the triangle meshes of each scan;
　sub-patches associated with the triangle meshes of each scan; none, one or a plurality of sub-patches being associated with the triangle meshes of each scan;

computing for each patch associated with the triangle meshes of each scan, an average normal said average normal being defined as the average of all normals at mesh triangle vertices, normals being unit vectors perpendicular to the mesh surface;
computing for each sub-patch associated with the triangle meshes of each scan:
　an average normal; and
　a number of common mesh boundary vertices, said common mesh boundary vertices being defined as mesh vertices lying on the mesh boundary of both a patch and a sub-patch;
for each sub-patch:
　If the number of vertices of the triangle mesh of the sub-patch is less than a specified threshold, adding the sub-patch to the patch that has the largest number of common boundary vertices with the sub-patch irrespective of the value of the angle between the average normals of the patch and sub-patch;
　If the number of vertices of the triangle mesh of the sub patch is greater than a specified threshold and
　if the angle between the average normal of the patch and the average normal of the sub-patch does not exceed a user specified value, adding the sub-patch to the patch that has the largest number of common boundary vertices with the sub-patch;
　if the angle between the average normal of the patch and the average normal of the sub-patch exceeds a user specified value, adding the sub-patch to another patch having a smaller number of common boundary vertices with the sub-patch.
　If for all patches, the angle between the average normal of the patch and the average normal of the sub-patch exceeds the user specified value, considering the sub-patch as a new patch.
compensating for broken triangles in each patch.

Thereby, the texture can be mapped on the digital object model more efficiently and the disadvantages of the prior art are overcome.

Further embodiments of the invention are provided in the appended dependent claims.

The advantages of the present invention are:
Since the partitions are human readable, a human editing of the texture is easier to make after the mapping of the texture;
The memory comprising texture data is more efficiently used in interactive applications;
Since the number of partitions is small (in the order of the number of the original scans), these partitions are easier to process.

The foregoing, together with other objects, features, and advantages of this invention can be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

PREFERRED EMBODIMENT OF THE INVENTION

The following description is presented to enable one or ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Method for Partitioning a 3D Surface in Order to Map a Texture

Figure 1:
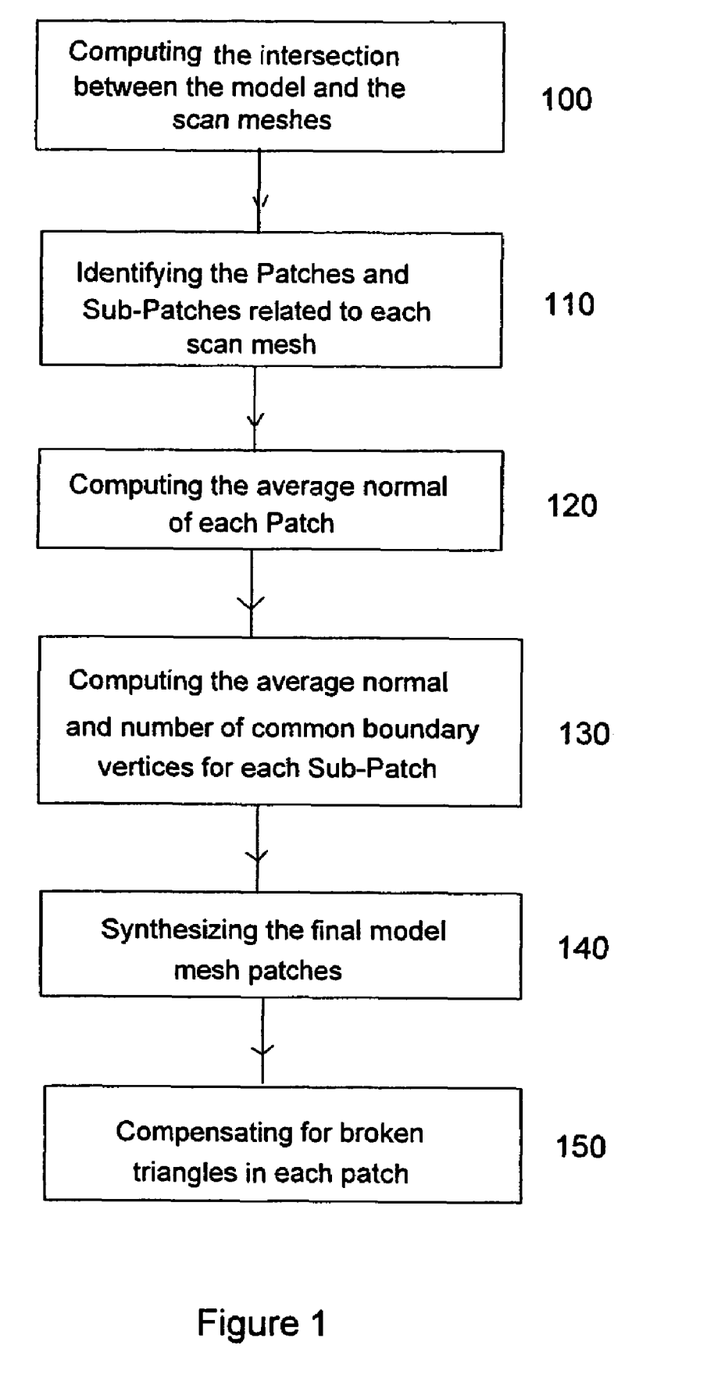
FIG. 1 is a logic flow diagram showing the main steps of the method for partitioning a 3D surface of a digital object model according to the present invention.

Reference is made to FIG. 1, which is a logic flow diagram showing the main steps of the method for partitioning a three dimensional (3D) surface in order to map a texture according to the present invention.

The present method is heuristic and uses the original captured scan information. After the alignment of the scans, the method divides the digital model triangle mesh, where the association with the original scans is discarded, into a number of patches (partitions) according to the following steps:

computing the intersection between the triangle mesh of the digital object model and the triangle meshes of each scan 100, each scan having at least one triangle mesh.

identifying the patches and sub-patches (part of a patch) associated with the triangle meshes of each scan 110, Only one patch is associated with the triangle meshes of each scan.

None, one or a plurality of sub-patches are associated with the triangle meshes of each scan.

computing for each patch, the average normal (average of all normals at the mesh triangle vertices) 120, computing for each sub-patch the average normal and the number of common mesh boundary vertices (mesh vertices lying on the mesh boundary of both a patch and a sub-patch) 130, synthesising the final mesh patches of the digital model surface 140, compensating for broken triangles in each patch 150.

The number of patches (partitions) is in the order of the number of the original scans.

Figure 2:
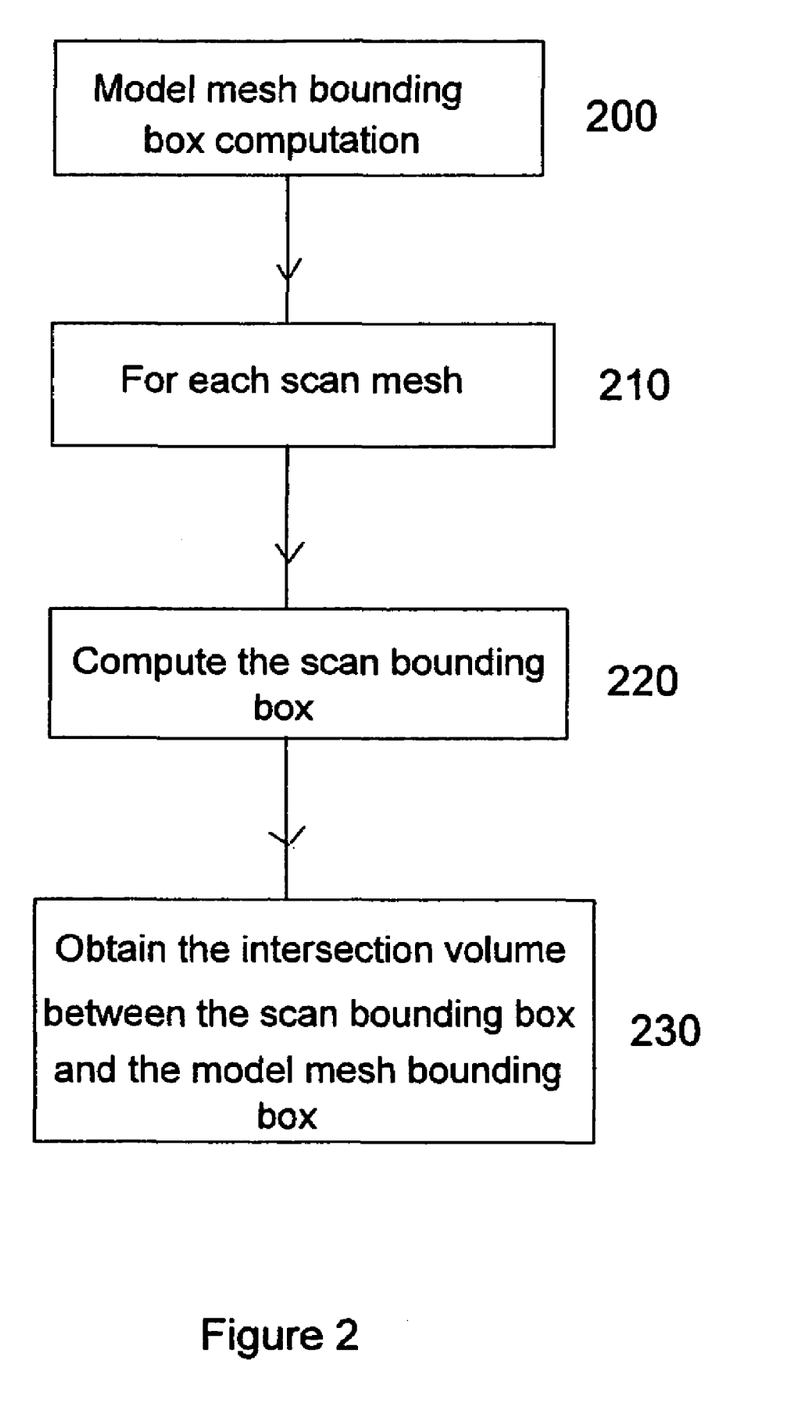
FIG. 2 is a logic flow diagram of the method for computing the intersection between the triangle mesh of the digital object model and the triangle meshes of each scan according to the present invention.

Step 1: Computing the Intersection Between the Triangle Mesh of the Digital object Model and the Triangle Meshes of Each Scan FIG. 2 is a logic flow diagram of the process for computing the intersection volume between the triangle mesh of the digital object model and the triangle meshes of each scan. This process comprises the following steps:

Computing a model triangle mesh bounding box (the smallest box containing the triangle mesh of the digital object model, whose edges are along the x, y and z Cartesian directions) 200.

For each scan of the digital object model 210 (preferably starting with the scan that has less angular variations with the view direction), computing the bounding box of the scan 220; and determining the intersection volume between the bounding box of the scan and bounding box of the triangle mesh of the digital object model 230.

Figure 3:
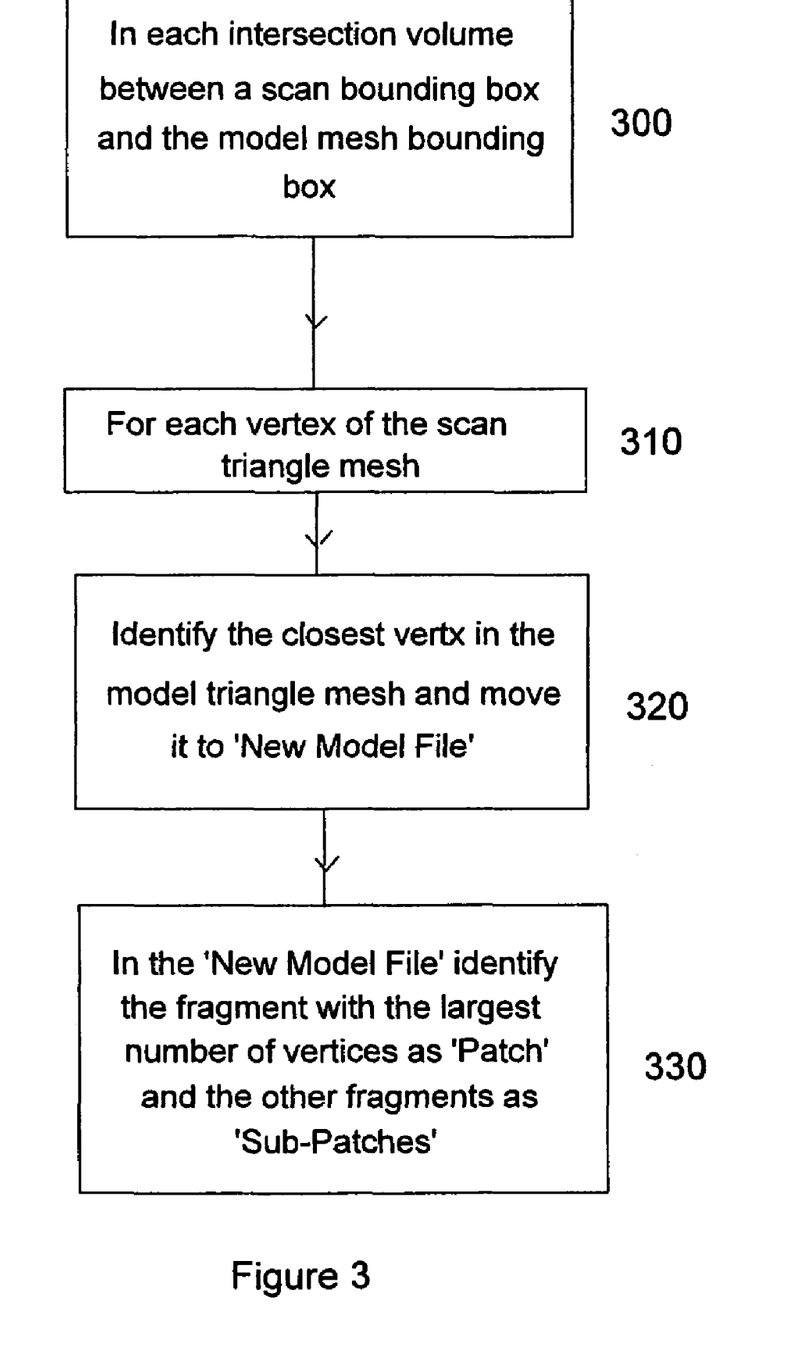
FIG. 3 is a logic flow diagram of the method for identifying the patches and sub-patches related to each scan mesh according to the present invention.

Step 2: Identifying the Patches and Sub-Patches Associated with the Triangle Meshes of Each Scan FIG. 3 is a logic flow diagram of the process for identifying the patches and sub-patches associated with the triangles meshes of each scan.

In each intersection volume between a scan bounding box and the bounding box of the digital object model triangle mesh 300;

For each vertex in the scan 310, identifying the closest vertex in the model triangle mesh, the closest vertex being defined as the vertex in the triangle mesh of the digital object model that has the minimum distance to a particular vertex in the scan triangle meshes (disconnected triangles from the model mesh should be removed first), and storing the identified closest vertex in a file that will be called in the present description "New Model File" 320.

Each group of connected vertices in the "New Model File" is considered as a separate mesh fragment (connected vertices are defined as points connected by edges to make triangles in a triangle mesh). This results in a number of height-field fragments.

In the "New Model File":

identifying the mesh fragment with the largest number of vertices (should be above a threshold value) as "Patch".

Identifying the other fragments as "Sub-Patches" 330.

After completing the above operations for each scan, the small remaining mesh fragments of the triangle mesh of the digital object model (as a result of hole filling for example) are also stored in the "New Model File" and are identified as "Sub-Patches". Therefore, at the end of the process, the "New Model File" comprises a number of mesh fragments identified as "Patches" and a number of mesh fragments identified as "Sub-Patches".

Step 3: Computing the Average Normal of Each Patch

Figure 4:
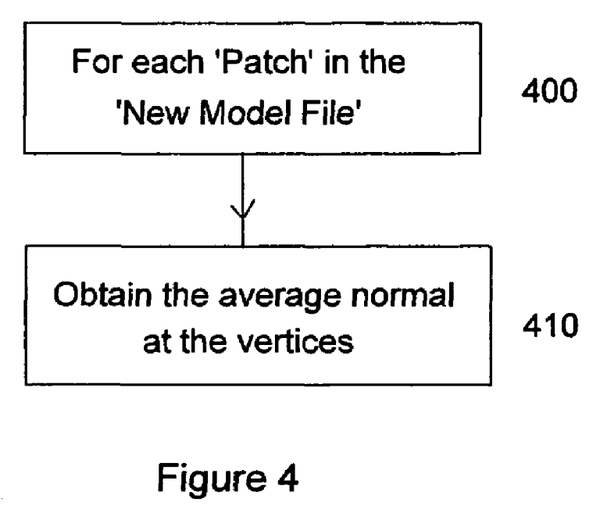
FIG. 4 is a logic flow diagram of the method for computing of the average normal of each patch according to the present invention.

FIG. 4 is a logic flow diagram showing the process for computing the average normal of each patch in the "New Model File". For each "Patch" 400, the average normal is computed 410. The average normal is the average of all normals at mesh triangle vertices (a normal is an unit vector perpendicular to the mesh surface).

Figure 5:
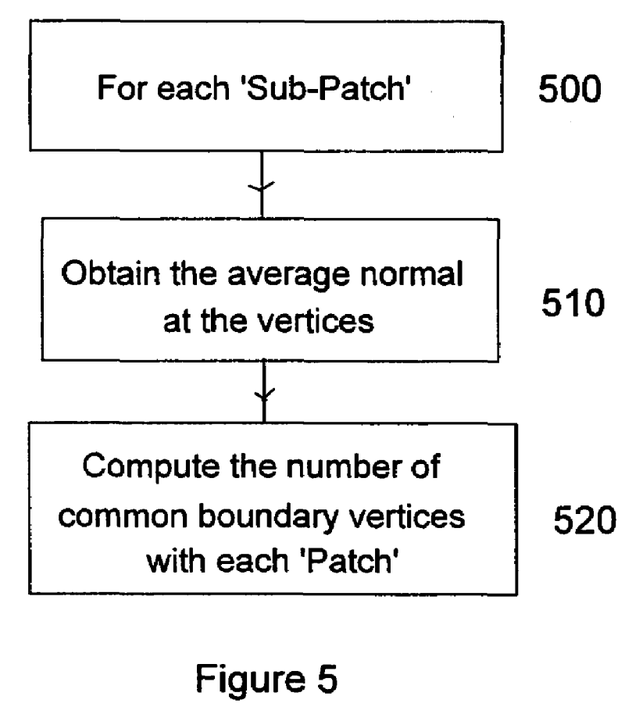
FIG. 5 is a logic flow diagram of the method for computing the average normal and the number of common mesh boundary vertices of each sub-patch according to the present invention.

Step 4: Computing the Average Normal and the Number of Common Mesh Boundary Vertices for Each Sub-Patch FIG. 5 is a logic flow diagram showing the process for computing the average normal and the number of common mesh boundary vertices for each sub-patch stored in the "New Model File".

For each "Sub-Patch" 500:
computing the average normal from the normals (unit vectors perpendicular to the mesh surface) at the vertices of the "Sub-Patch" 510
computing the number of common mesh boundary vertices with each "Patch" 520.

Step 5: Synthesising the Final Model Mesh Patches

Figure 6:
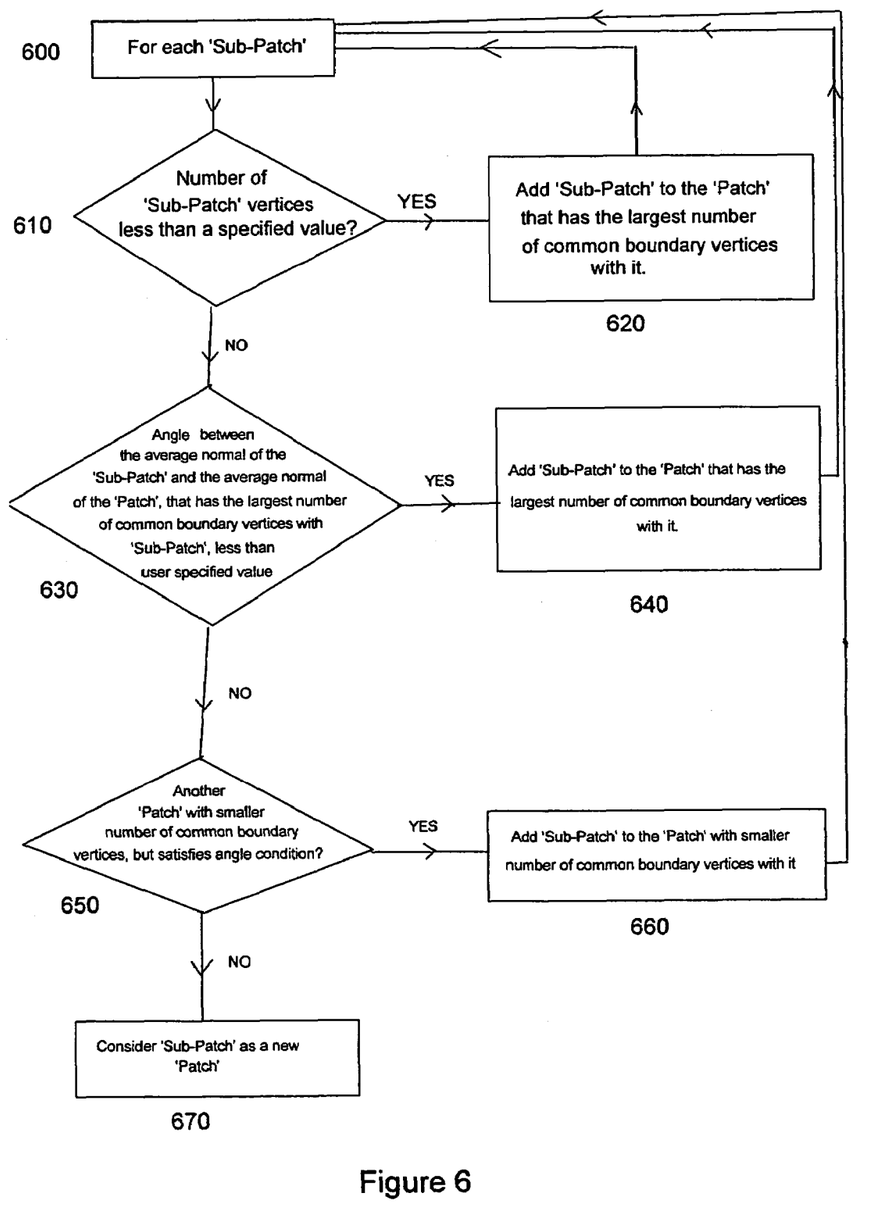
FIG. 6 is a flowchart of the method for synthesising the final mesh patches of the digital model surface according to the present invention.

FIG. 6 is a flowchart showing the process for synthesising the final mesh patches of the digital model surface stored in the "New Model File" according to the present invention.

For each "Sub-Patch" 600:
If the number of vertices of the triangle mesh of the "Sub-Patch" is less than a specified threshold 610:
  adding the "Sub-Patch" to the "Patch" that has the largest number of common boundary vertices with the "Sub-Patch" 620 (irrespective of the value of the angle between the average normals of the "Patch" and the Sub-Patch").
If the number of vertices of the triangle mesh of the "Sub-Patch" is greater than a specified threshold:
  if the angle between the average normal of the "Patch" and the average normal of the "Sub-Patch" does not exceed a user specified value 630:
    adding the "Sub-Patch" to the "Patch" that has the largest number of common boundary vertices with the "Sub-Patch" 640.
  if the angle between the average normal of the "Patch" and the average normal of the "Sub-Patch" exceeds a user specified value 650:
    adding the Sub-Patch" to another "Patch" having a smaller number of common boundary vertices with the "Sub-Patch" 660.
If for all patches, the angle between the average normal of the "Patch" and the average normal of the "Sub-Patch" exceeds the user specified value:
  considering the "Sub-Patch" as a new "Patch" 670.

Step 6: Compensating for Broken Triangles in Each Patch

Figure 7:
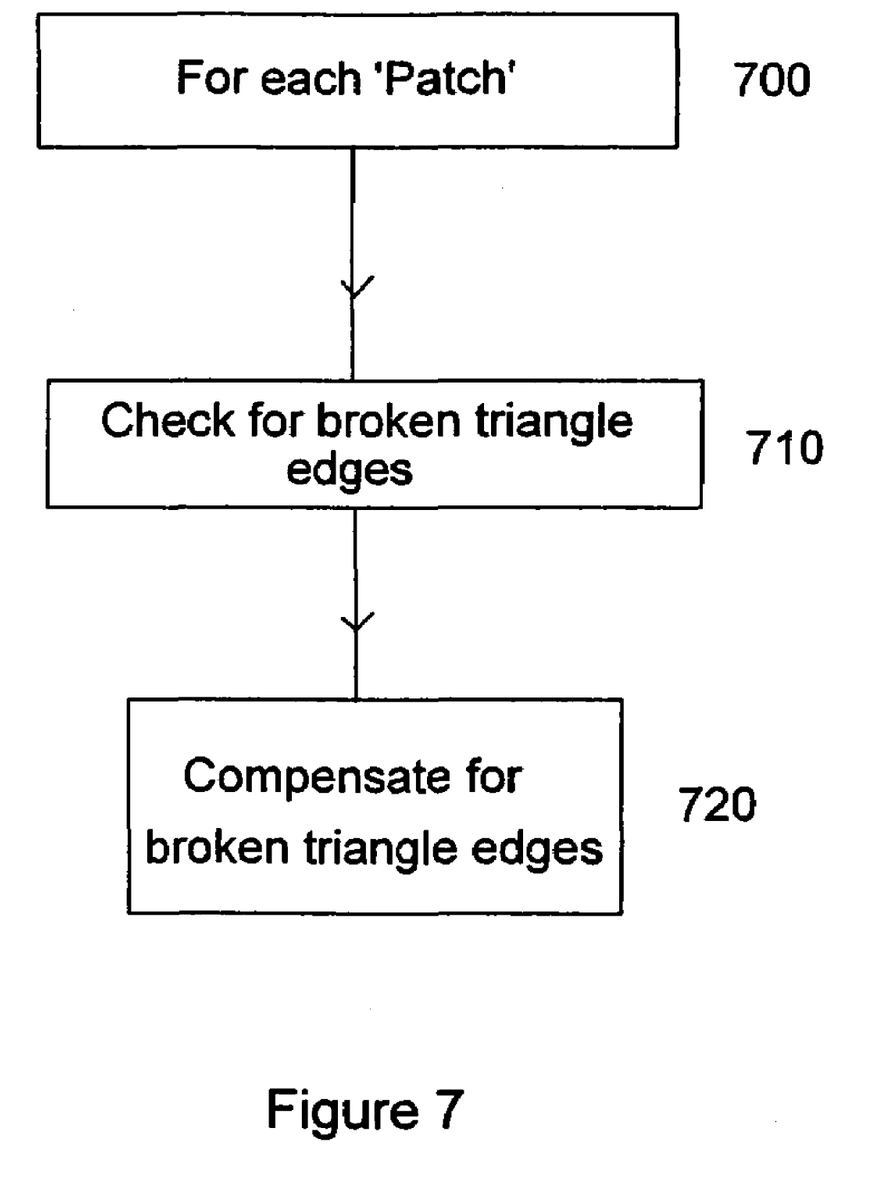
FIG. 7 is a logic flow diagram of the method for compensating for broken triangles in each patch according to the present invention.

FIG. 7 is a logic flow diagram showing the process for compensating for broken triangles in each patch stored in the "New Model File".

For each "Patch" 700:
identifying edges of broken triangles in the patch 710, and adding vertices where the edges of mesh triangles are broken 720.

Therefore, at the end of the process, the "New Model File" comprises a number of height-field patches in the order of the number of the scans, with boundaries that are as regular as possible.

Although illustrative embodiment of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

The invention claimed is:

1. A method for partitioning a triangle mesh representing the surface of a digital object model into a plurality of patches in order to map a texture, according to the following steps:
   determining for each scan of the digital object model, the intersection between the triangle mesh of the digital object model and the one or plurality of triangle meshes associated with the scan, at least one triangle mesh being associated with each scan of the digital object model;
   identifying a patch associated with the triangle meshes of each scan, only one patch being associated with the one or plurality of triangle meshes of each scan; sub-patches associated with the triangle meshes of each scan; none, one or a plurality of sub-patches being associated with each scan;
   determining for each patch associated with the triangle meshes of each scan, an average normal, said average normal being defined as the average of all normal at mesh triangle vertices, normal being unit vectors perpendicular to the mesh surface;
   determining for each sub-patch associated with the triangle meshes of each scan: an average normal; and a number of common mesh boundary vertices, said common mesh boundary vertices being defined as mesh vertices lying on the mesh boundary of both a patch and a sub-patch; for each sub-patch: if the number of vertices of the triangle mesh of the sub-patch is less than a specified threshold, adding the sub-patch to the patch that has the largest number of common boundary vertices with the sub-patch irrespective of the value of the angle between the average normal of the patch and sub-patch; if the number of vertices of the triangle mesh of the sub-patch is greater than a specified threshold and if the angle between the average normal of the patch and the average normal of the sub-patch does not exceed a user specified value, adding the sub-patch to the patch that has the largest number of common boundary vertices with the sub-patch; if the angle between the average normal of the patch and the average normal of the sub-patch exceeds a user specified value, adding the sub-patch to another patch having a smatter number of common boundary vertices with the sub-patch; if for all patches, the angle between the average normal of the patch and the average normal of the sub-patch exceeds the user specified value, considering the sub-patch as a new patch;
   compensating for broken triangles in each patch.

2. The method as claimed in claim 1 wherein the step of determining the intersection between the triangle mesh of the digital object model and the scan triangle meshes, comprises the further steps of:
   determining a model triangle mesh bounding box, the bounding box of the model triangle mesh being defined as the smallest box, containing the triangle mesh of the digital object model, whose edges are along the three Cartesian directions, x, y and z; for each scan of the digital object model,
   determining a scan bounding box, the bounding box of the scan being defined as the smallest box containing the scan triangle meshes, whose edges are along the three Cartesian directions x, y and z; and
   determining the intersection volume between the bounding box of the scan and the bounding box of the triangle mesh of the digital object model.

3. The method as claimed in claim 2 wherein the steps of:
for each scan of the digital object model,
  determining the bounding box of the scan; and
  determining the intersection volume between the bounding box of the scan and the bounding box of the triangle mesh of the digital object model are performed starting with the scan of the digital object model that has less angular variations with a direction corresponding to the direction to which a viewer is looking at the digital object.

4. The method as claimed in claim 3, wherein the step of identifying patches and sub-patches associated with each scan triangle mesh, comprises the further steps of;
  for each intersection volume between a scan bounding box and the bounding box of the digital object model triangle mesh and for each vertex in the scan triangle meshes: identifying a closest vertex in the model triangle mesh, the closest vertex being defined as the vertex in the triangle mesh of the digital object model that has a minimum distance to a particular vertex in the scan triangle meshes; storing the identified closest vertex; identifying the mesh fragment with the largest number of vertices as patch, each group of connected vertices being considered as a separate mesh fragment, connected vertices being defined as points connected by edges to make triangles in a triangle mesh; identifying the other fragments as sub-patches.

5. The method as claimed in claim 4 wherein the step of determining, for each sub-patch associated with the triangle meshes of each scan, a number of common mesh boundary vertices defined as mesh vertices lying an the mesh boundary of both a patch and a sub-patch, comprises the further step of:
  determining the number of common mesh boundary vertices with each patch.

6. The method as claimed in claim 5 wherein the step of compensating for broken triangles in each patch, comprises the further steps of:
  for each patch: identifying edges of broken triangles in the patch, and
  adding vertices where the edges of mesh triangles are broken.

7. A system comprising means adapted for carrying out the step of the method according to any one of claims 1-6.

* * * * *